Patented Mar. 23, 1943

2,314,615

UNITED STATES PATENT OFFICE 2,314,615

PRODUCTION OF NITRO COMPOUNDS

Reginald George Franklin and Frederick James Wilkins, Norton-on-Tees, England, assignors to Imperial Chemical Industries Limited, a corporation of Great Britain No Drawing. Application June 11, 1940, Serial No. 339,902. In Great Britain July 25, 1939

4 Claims. (Cl. 260—644)

This invention relates to the manufacture of nitro compounds, in particular of di-nitro derivatives of olefines.

One object of the invention is to provide a process for the production of nitro-olefines, especially dinitro-olefines. Another object is to provide a process for reacting butadiene with nitrogen dioxide under controlled temperature conditions. A further object is to provide new nitro compounds. Further objects will appear hereinafter.

According to the present invention aliphatic hydrocarbons having conjugated double bonds are treated with liquid or gaseous nitrogen dioxide or with gaseous mixtures containing nitrogen dioxide.

The process of this invention is not restricted in its application to a pure aliphatic hydrocarbon having conjugated double bonds, or to mixtures of such hydrocarbons, but may also be applied to the said hydrocarbons when containing such impurities as may result from their manufacture. The reaction may be carried out either in the vapor phase or in the liquid phase. When working in the liquid phase it is desirable to employ a solvent for the hydrocarbon and the nitrogen dioxide. Inert gases, such as carbon dioxide and nitrogen, and inert hydrocarbons such as methane, may advantageously be used as diluents to control the reaction, especially when working appreciably above atmospheric temperature.

The following examples illustrate the process of the present invention.

Example 1

14 parts by weight of pure dry liquid nitrogen dioxide were dissolved in 36 parts by weight of sodium-dried ether and added gradually to 15 parts by weight of liquid butadiene dissolved in 36 parts by weight of dried ether contained in a vessel cooled in ice and salt. The liquid was kept well mixed in order to avoid local over-heating. After the addition was complete, the solution was put under reduced pressure and part of the ether evaporated off, when a crop of yellow crystals of a di-nitro butylene formed. The crystals were separated from the liquid by filtration and washed with ether. More ether was then added to the filtrate and further evaporation carried out, which yielded a second crop of yellow crystals. These were separated and washed in the same manner as for the first crop, and the process was repeated to obtain a further crop of crystals.

The crystals thus obtained can be stored at the temperature of solid carbon dioxide, but they change slowly to a dark liquid at room temperature. On complete removal of ether from the ethereal filtrate, a di-nitro butylene in the form of a red oil is left, which goes almost solid on standing for some days. The complete removal of the ether must be done carefully otherwise there is a danger of explosion.

The reaction can be carried out in the manner indicated above with carbon tetrachloride or ligroin instead of ether as a solvent, but a di-nitro butylene in the form of a red oil is then obtained. The red oil so produced is fairly stable at 0° C. but tends to ignite on contact with air.

Example 2

1 volume of butadiene was reacted in the gaseous phase with rather less than 2 volumes of nitrogen dioxide in the presence of carbon dioxide at a temperature of 80–85° C. The gaseous reactants, each diluted with carbon dioxide in an amount such that the total volume of carbon dioxide to the total volume of reactants was in the ratio of 85:15, impinged side by side through jets on to the bulb of a thermometer in a reaction vessel surrounded by a circulating water jacket and fitted with a drain tap for frequent removal of the product.

A di-nitro butylene in the form of a fluid oil was thus obtained and collected in a tube cooled by ice. Solid yellow crystals as produced in Example 1 can be obtained from the fluid oil by treating it with ether or ethyl alcohol.

The fluid oil is converted partially into a solid (probably a polymer of a di-nitro butylene) when stored at low temperature in ice or solid carbon dioxide, but the solid reverts to the liquid form on heating to 35° C. for about one hour. The oil can be kept at 35° C. for several hours, but with prolonged heating it darkens slowly and becomes unstable.

The fluid oil referred to above is believed to be 1:4 di-nitro β-butylene and had a molecular weight of 155 in acetone. It was partly soluble in water, the aqueous layer having a pH of 3. It was completely soluble in methanol and in acetic acid. It dissolved in ethyl alcohol to give a brown solution and a yellow precipitate of melting point 56° C. When treated with ethyl ether, it gave a yellow precipitate of melting point 58° C. The yellow precipitate appears to be the aci-form of the di-nitro butylene.

Compounds of this general type are characterized by utility in a number of fields. For instance, they serve as solvents for cellulose derivatives and the like, as intermediates in the manufacture of certain diamino compounds and possess insecticidal properties.

Other hydrocarbons which may be reacted in accordance with the invention include isoprene, methyl isoprene and other homologues of isoprene.

As many widely different embodiments of this invention may be made without departing from the spirit or scope thereof, it is to be understood that we do not limit ourselves to the specific embodiments thereof, except as defined in the appended claims.

We claim:

1. As a new chemical compound 1,4-dinitrobutene-2.

2. The process of reacting nitrogen dioxide with butadiene which comprises intermingling the nitrogen dioxide with butadiene in the presence of a gaseous inert diluent.

3. The process of reacting nitrogen dioxide with butadiene which comprises dissolving said nitrogen dioxide and said butadiene in a common solvent and intermingling the same in said liquid phase.

4. The process of reacting nitrogen dioxide with butadiene in vapor phase which comprises diluting gaseous nitrogen dioxide with an inert gas, diluting gaseous butadiene with an inert gas and intermingling said diluted nitrogen dioxide with said diluted butadiene in vapor phase.

REGINALD GEORGE FRANKLIN.
FREDERICK JAMES WILKINS.